T. Guice,

Cotton Plow.

No. 109,893.          Patented Dec. 6, 1870.

Witnesses:                    Inventor:
                              Thomas Guice,
                         PER
                              Attorneys.

UNITED STATES PATENT OFFICE.

THOMAS GUICE, OF MOUNT ANDREW, ALABAMA.

IMPROVEMENT IN COTTON-PLOWS.

Specification forming part of Letters Patent No. 109,893, dated December 6, 1870.

*To all whom it may concern:*

Be it known that I, THOMAS GUICE, of Mount Andrew, in the county of Barbour and State of Alabama, have invented a new and Improved Cotton-Plow; and I do hereby declare the following to be a full, clear, and exact description of the same, reference being had to the accompanying drawings, making a part of this specification, in which—

Figure 1:
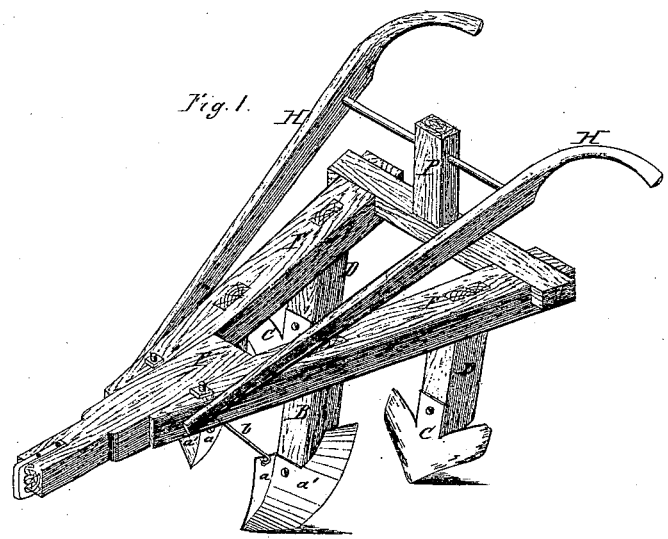
Figure 2:
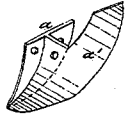

Figure 1 is a perspective view of the plow. Fig. 2 is a similar view of a single blade detached.

This invention relates to an improvement in that class of cotton plows or scrapers in which a front plow scrapes the sides of the rows or ridges; and the improvement consists in the specific construction and arrangement of front cutting-plows and rear double-winged plows, as hereinafter described.

In the drawings, Fig. 2 shows the forward or turner plow-blade, consisting of a vertical triangular plate, *a*, and an inclined mold-board or scraper-plate, *a'*, cast or otherwise attached at its vertical edge to the side of the plate *a*, as shown in the drawings, the form of the two plates being substantially as represented in Figs. 1 and 2. These blades or shovels are attached to the fore standards, B B, by bolts passing laterally through the rear edge of the plates *a a*, and by the other bolts passing back through the inner edge of the plates *a'*. Braces *b b* extend from the front corners of the vertical plates upward and forward to the frame or the draft-pole.

To the rear standards, D D, are attached double-winged plows or sweeps C C, which follow the plows *a a'*.

The frame is of the common triangular pattern F F, having handles H H, supported by a post, P. Such a construction brings the rear plow-standards slightly outside of the line of the front plows; but the wings of the rear plows extending inward approach each other nearer than do the two forward plows, which, when in the position shown in the drawings, have their vertical parallel sides *a a* adjacent.

The plows, both front and rear, are to be made of the best steel, and the two plates *a a'* of the front plows may be attached to the standards, or connected together in such a manner that one can be removed without detaching the other, if desired.

Braces similar to those shown at *b b* may be employed to strengthen and support the rear standards, D D, as well as those in front.

A clevis will of course be attached to the frame, and the latter, when not used with the plows, may be employed as a harrow-frame.

Having thus described my invention, what I claim as new, and desire to secure by Letters Patent, is—

The plows *a a'* and double-winged plows C C, each constructed and both sets relatively arranged in the particular manner shown and described, whereby they are adapted to cut a furrow with a vertical side, and to scrape along each side of the cotton-plant row or ridge and clean the furrow of loose dirt.

To the above specification of my invention I have signed my hand this 5th day of September, A. D. 1870.

THOMAS GUICE.

Witnesses:
   H. D. CLAYTON,
   G. E. MACON.